May 31, 1966 L. HONOLD ETAL 3,253,371
SECTIONED FACING
Filed Jan. 24, 1962 8 Sheets-Sheet 7

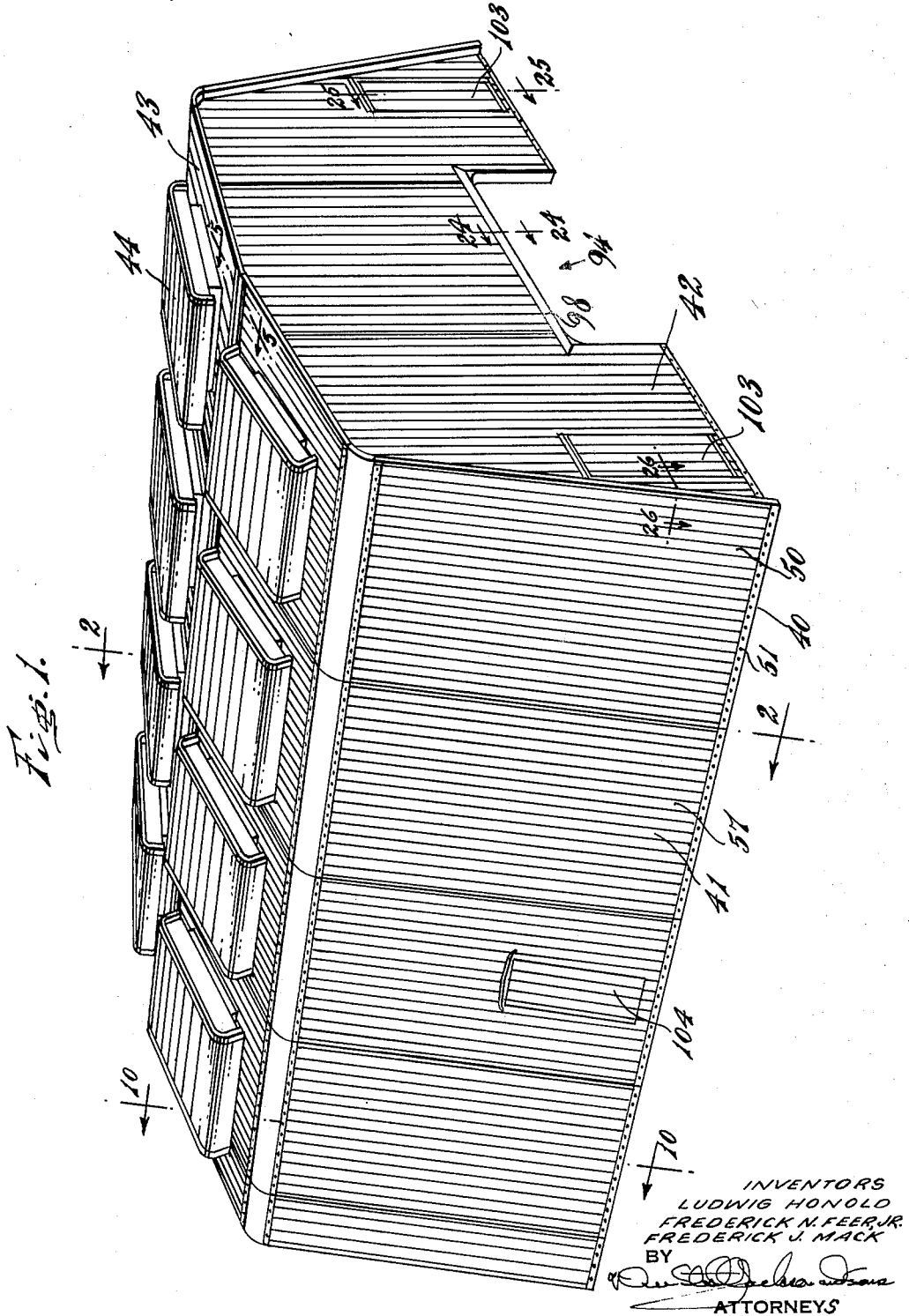

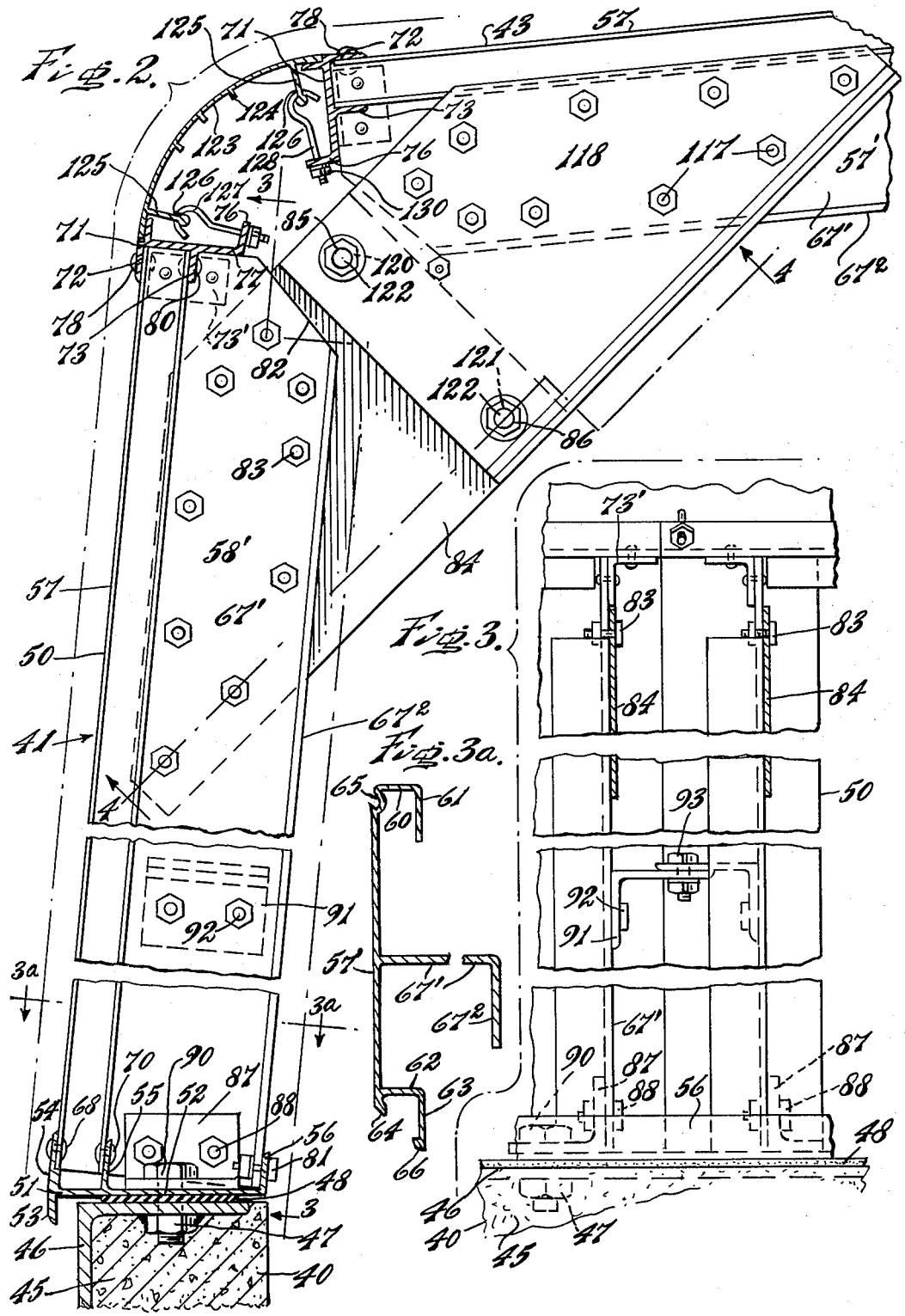

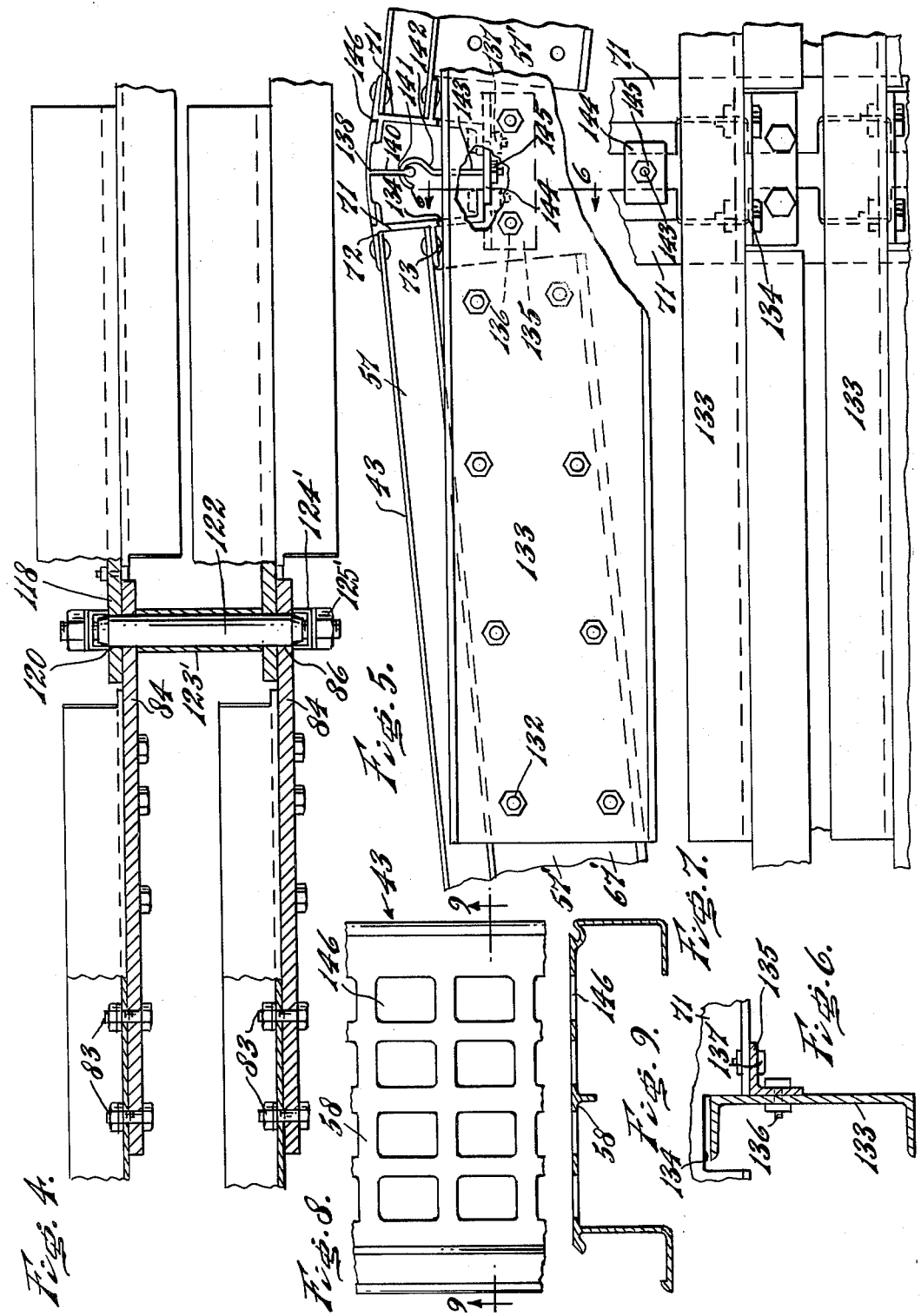

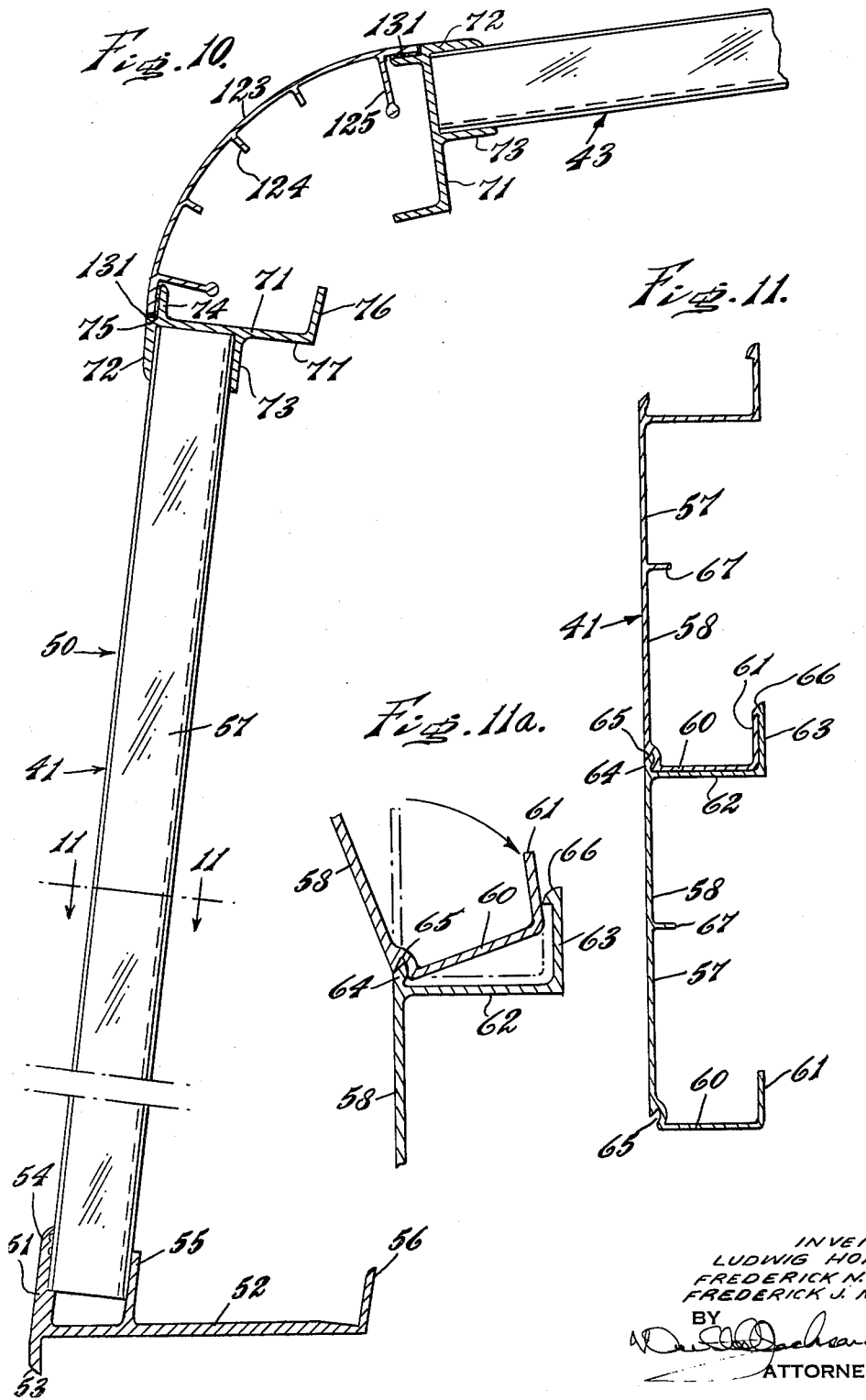

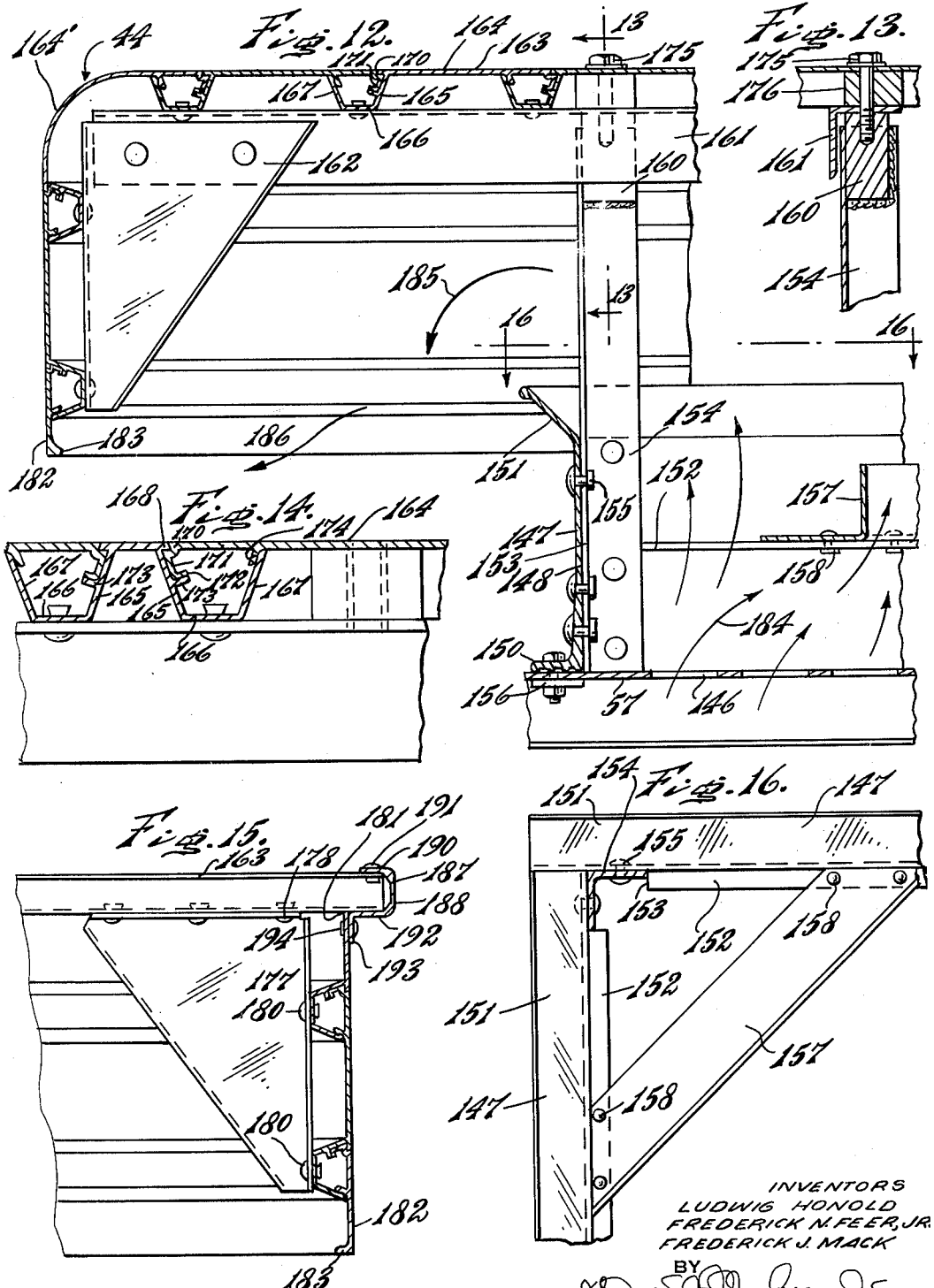

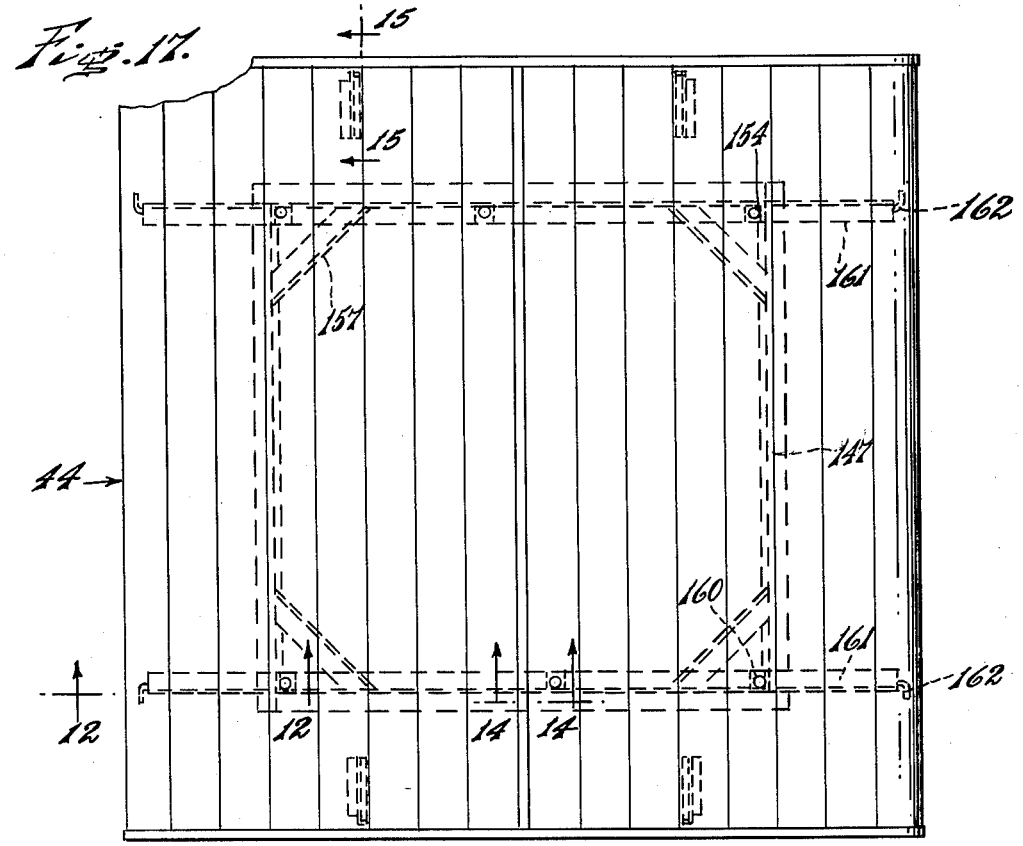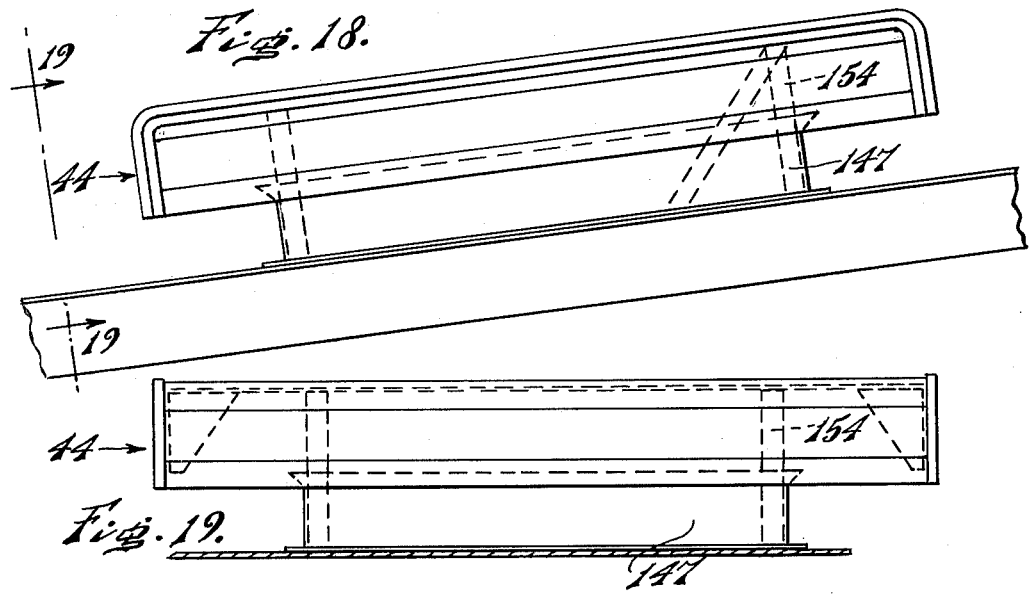

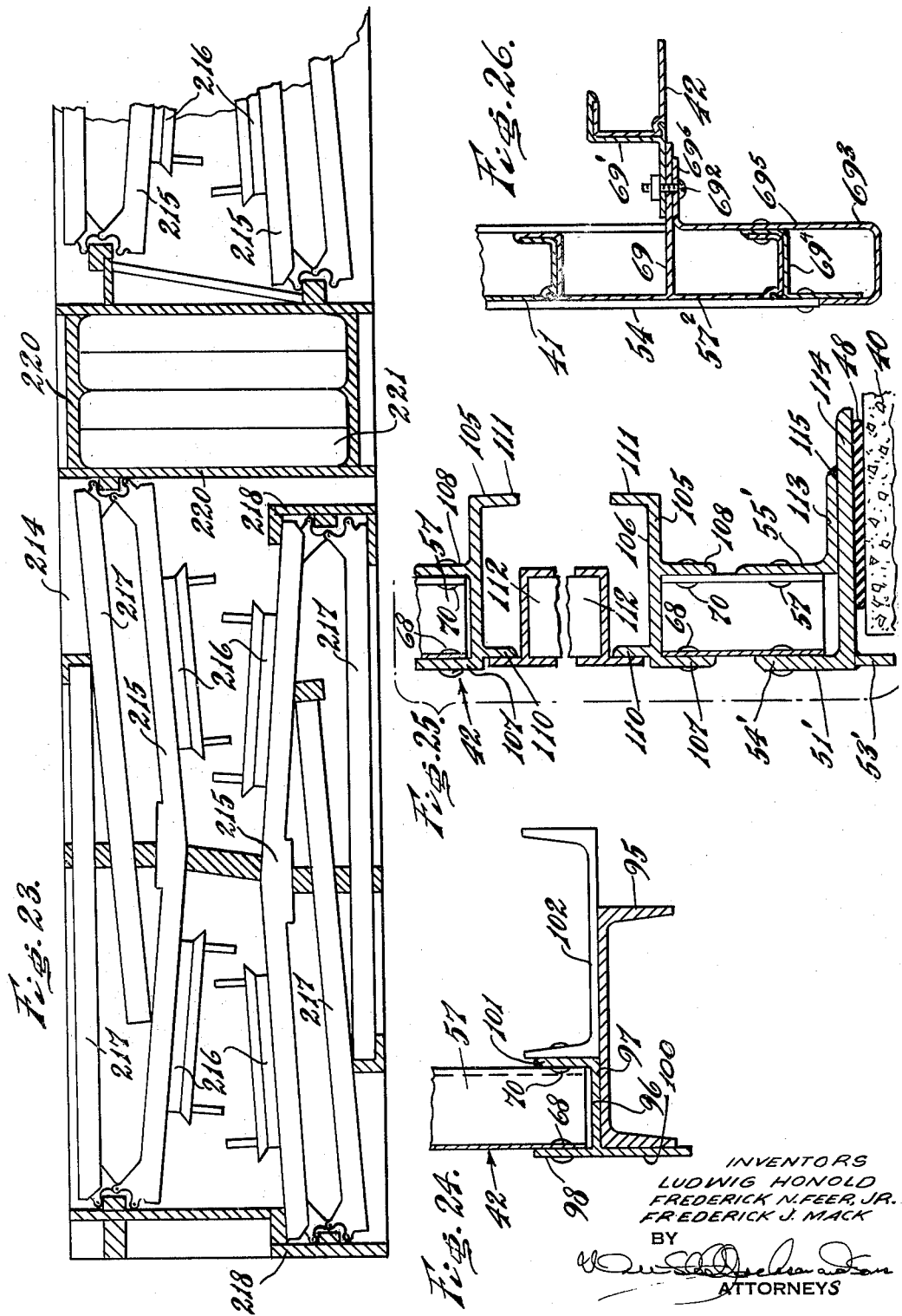

United States Patent Office 3,253,371
Patented May 31, 1966

3,253,371
SECTIONED FACING
Ludwig Honold, Prospect Park, and Frederick N. Feer, Jr., and Frederick J. Mack, Media, Pa., assignors to Ludwig Honold Manufacturing Company, Folcroft, Pa., a corporation of Pennsylvania
Filed Jan. 24, 1962, Ser. No. 168,376
2 Claims. (Cl. 52—86)

This application has been divided, the subject matter divided out herefrom now appears in our co-pending applications for Building Structure, Serial No. 429,550, and for Roof Vent Construction, Serial No. 429,549, both applications filed on February 1, 1965.

The present invention relates to housings, particularly of the character which are suitable to house machinery and equipment, but permissibly also to housings which are intended to provide special buildings, huts or the like.

A purpose of the invention is to produce a housing which will be very readily transferred in compact form to a site for erection.

A further purpose is to provide a housing which will permit ready access to any part of the structure, as for example for servicing machinery or equipment, or for performing scientific observations or the like.

A further purpose is to hingedly connect the roof structure with the side walls, so that individual elements can be supplied with hinged connection but suitably folded.

A further purpose is to provide a removable corner at the roof of a housing so that the corner can be separated to permit pivoting of the roof and the side wall.

A further purpose is to increase the structural strength and the resistance to windage of a housing.

A further purpose is to provide better corrosion resistance for a housing for machinery and equipment, with due allowance for different types of corrosion which may be encountered in different parts of the world.

A further purpose is to improve the structure for ventilating the housing.

A further purpose is to permit the side walls and also the roof elements of a housing to snap together.

Further purposes appear in the specification and in the claims.

In the drawings we have chosen to illustrate a few only of the numerous embodiments in which our invention may appear, selecting the forms shown from the standpoints of convenience in illustration, satisfactory operation and clear demonstration of the principles involved.

FIGURE 1 is a perspective of the completed housing of the invention.

FIGURE 2 is an enlarged fragmentary section of FIGURE 1 on the line 2—2.

FIGURE 3 is a section of FIGURE 2 on the line 3—3, looking from the inside toward the side wall.

FIGURE 3a is a fragmentary section on the line 3a—3a of FIGURE 2 showing one snap-in extrusion with the related structural flange partly broken away.

FIGURE 4 is a section on the line 4—4 of FIGURE 2 showing the corner construction looking diagonally outwardly and upwardly.

FIGURE 5 is a fragmentary section on the line 5—5 of FIGURE 1 showing the peak of the roof.

FIGURE 6 is a fragmentary section on the line 6—6 of FIGURE 5.

FIGURE 7 is a bottom plan view of FIGURE 5 showing the roof.

FIGURE 8 is a fragmentary top plan view of the roof structure below the ventilator cover, illustrating a single extrusion.

FIGURE 9 is a section of FIGURE 8 on the line 9—9.

FIGURE 10 is section on the line 10—10 of FIGURE 1 partially broken away.

FIGURE 11 is an enlarged fragmentary section of FIGURE 10 on the line 11—11.

FIGURE 11a is an enlarged fragment of FIGURE 11 showing the insertion of the snap-in extrusions.

FIGURE 12 is a vertical section of one form of the ventilating assembly, partially broken away, the section being taken on the line 12—12 of FIGURE 17.

FIGURE 13 is a fragmentary section on the line 13—13 of FIGURE 12.

FIGURE 14 is a vertical section of the ventilator cover at the point where the cross over occurs between left and right end extrusions, the section being taken on the line 14—14 of FIGURE 17.

FIGURE 15 is a vertical section of the ventilator assembly, the section being taken on the line 15—15 of FIGURE 17.

FIGURE 16 is a fragmentary plan section of the ventilator assembly, the section being taken on the line 16—16 of FIGURE 12.

FIGURE 17 is a fragmentary top plan view of the ventilator assembly to reduced scale as compared with FIGURES 12 and 16.

FIGURE 18 is a side elevation of the ventilator assembly of FIGURE 17.

FIGURE 19 is an end elevation of the ventilator assembly taken on the line 19—19 of FIGURE 18.

FIGURE 20 is a top plan view eliminating the ventilator cover, showing the modified ventilator assembly.

FIGURE 21 is a side elevation of the modified ventilator assembly of FIGURE 20, showing the ventilator cover in dot-and-dash lines.

FIGURE 22 is an enlarged fragmentary section on the line 22—22 of FIGURE 20.

FIGURE 23 is a fragmentary central longitudinal section through the shipping container, showing the parts themselves in elevation.

FIGURE 24 is an enlarged fragmentary section on the line 24—24 of FIGURE 1, showing the header construction for the end access opening.

FIGURE 25 is an enlarged fragmentary section on the line 25—25 of FIGURE 1, showing the construction of the door header and sill.

FIGURE 26 is a section on the line 26—26 of FIGURE 1.

Figure 20:
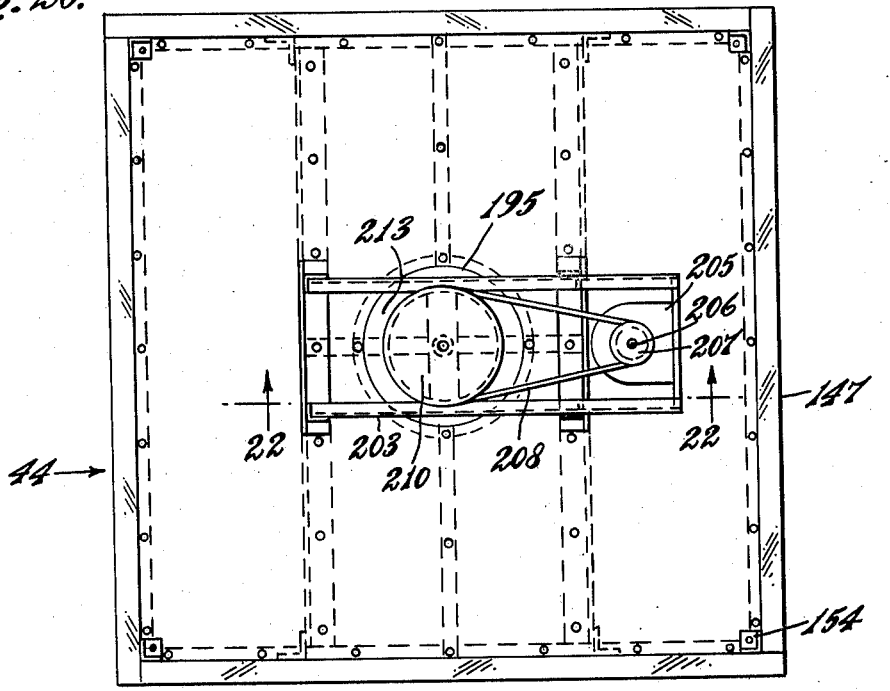
FIGURES 20 to 22 show a variation in the ventilator assembly.

Describing in illustration but not in limitation and referring to the drawings:

There is considerable need for a housing which can be shipped in folded or knocked down condition to any part of the world, including the Arctic, or Antarctic and also including remote and inaccessible locations, for covering and protecting machinery and equipment such as turbines, engines, generators, radar equipment, scientific measuring equipment and the like. The housing of the invention lends itself to such service, both in cases of military installations; also for scientific expeditions, and in some cases for normal civilian uses.

One of the great advantages of the housing of the invention is that the elements are themselves relatively light, and also are not bulky. They can be shipped or transferred or hand carried to the site and installed readily with a minimum of tools.

One great advantage of the device of the invention is that it permits ready access to any part of the installation, for the purpose of servicing or testing or making of measurements or observations. Thus the side-walls can be opened up and removed at any place and the roof can be opened up and removed at any point. Another great advantage of the device of the invention is that it lends itself particularly to moving to another site by disassembly, or adding additional panels to lengthen the structure, or removal of panels to shorten the structure, so that the housing can be changed to fit the changed condition of the equipment or of the machinery.

The structure is primarily of aluminum alloy, and is designed to resist the elements and has very high resistance to corrosion in various environments. The structure also is designed to withstand adverse conditions, which may be encountered, for example, in the Arctic and Antarctic, such as winds of 135 miles per hour, and various atmospheric conditions, such as snow, sleet, ice and hail.

As explained more in detail later, individual components are hingedly connected in some cases so that they can readily be folded and handled as a unit.

Provision has been made for excellent ventilation, to carry off any gases generated by the machinery or equipment, and to provide comfortable working conditions for personnel.

Referring now to the drawings in detail, the housing of the invention consists of footings 40 on which are supported side walls 41, end walls 42, a roof 43, and ventilating assemblies 44, all of which are described more in detail later.

Each of the footings suitably comprises a concrete wall 45 which has embedded therein a metallic anchorage, suitably a steel angle 46 (FIGURE 2) which has one flange exposed at the top of the footing, and which has vertical openings distributed along its length beneath which metallic, suitably steel nuts 47, are welded, there being ample room provided in the concrete beneath the nuts to receive the anchorage bolts.

In order to insulate the angle 46 of the footing from the metallic structure of the housing and thus protect against electrolytic corrosion, an insulating strip 48 suitably of nylon of polyvinyl chloride is provided extending along the top of the footing.

The side wall 41 is made up of several suitably independent panels 50, which as later explained are capable of being removed independently from the housing to permit access to the machinery or equipment inside the housing.

Extending along the bottom of each panel 50, and best seen in FIGURE 2, is a foot extrusion 51 which has a web 52 resting on the insulating layer 48, has a downwardly extending skirt flange 53 at the outside, has a forwardly extending front flange 54 which defines the outside of the side wall at the bottom, has an inwardly limiting flange 55 extending upward and holding the panel extrusions and has an interior upwardly extending flange 56 which limits the beam flanges. This foot plate 51, in common with all of the other components being referred to (except where otherwise indicated) will suitably be of aluminum base alloy with suitable corrosion protection as required. The foot plate is suitably coterminous with each panel.

The body of the panel 50 above the foot plate 51 consists of a series of snap-in extrusions 57, each of which consists of a web 58 at the outside, a flange 60 at one end having an inwardly turned flange portion 61, and a slightly longer flange 62 at the other end having an outwardly turned flange portion 63. Beyond the flange 62 the web has a male snap-in extension 64 suitably pointed at the outer edge which is adapted to be received into a female snap-in socket 65 at the side adjoining the flange 60 of the next extrusion. The outwardly extending flange portion 63 extends toward the inside of the housing with respect to the flange portion 61 of the next extrusion and has outwardly extending snap-in projection 66 which engages the end or the edge of the flange portion 61. As initially formed and best seen in FIGURE 11a, the flange portion 61 is not parallel to the web 58 but diverges slightly from it so that when the female snap-in socket 65 receives the male snap-in extension 64 and a rocking motion takes place, the flange portion 61 elastically deflects and snaps in behind the recess of the projection 66 on the flange portion 63 to the position shown in dot-dash lines in FIGURE 11a. Thus it is possible to build up a succession of extrusions 58 to form the body of the panel 50.

At suitable positions along the web 58 the web is provided with inwardly extending stiffening ribs 67, only one of which is shown on each extrusion.

At the lower end each extrusion 57 is positioned between the flanges 54 and 55 of the foot plate 51 as best shown in FIGURE 10, with the flanges 54 and 55 fastened as by riveting to the flanges 61 and 63, suitable rivets being shown in FIGURE 2 at 68 and 70.

At the top of each panel, the extrusions 57 are received by horizontally extending header extrusions 71 best seen in FIGURES 2, 3 and 10. The header extrusions 71 involve downwardly extending outside flanges 72 which are outside the relatively vertical extrusions 57, downwardly extending inner flanges 73 which are inside the relatively vertical extrusions 57, upwardly extending flanges 74 which are set in enough from the outside to provide recess 75, upwardly extending inner flanges 76, and a web 77 which tends to trap any water and carry it endwise of the panel.

The flanges 72 and 73 are secured to the upwardly extending extrusions 57 by rivets 78 and 80 (FIGURE 2).

At the end of each panel 50, special extrusions are employed which provide a strengthening beam. The strengthening beam extrusion, as best seen in FIGURES 2, 3, and 3a, is exactly like the other generally vertical extrusions 57 as shown best in FIGURE 11, except that the strengthening rib is extended to a much deeper rib $67'$ which has at its inner end a flange $67^2$ which extends in the same direction as the portion flange 63. Thus there is relatively great depth of section to the strengthened extrusion.

The flange $67^2$ is suitably secured to the inner upstanding flange 56 of the foot plate 51 as by bolts 81 (FIGURE 2). At the top the end extrusions $57'$ have their ribs $67'$ and flanges $67^2$ suitably beveled at 82 so as not to interfere with parts of the roof structure. Also the rib $67'$ is notched to pass the flange 73 of header extrusion 71, and the flange 73 is secured at this point by riveted brackets $73'$.

The end-most extrusions of each panel which have the deep flange $67'$ near the top interconnect suitably by bolts 83 with diagonal upwardly and inwardly extending angle plates 84, best seen in FIGURES 2, 3 and 4. The angle plates near their upper and inner plates have pivot openings 85 and 86 which are to cooperate with corresponding angle plates from the roof as later explained.

Near the bottom of the flange portions $67'$ are secured angles 87 by bolts 88 best seen in FIGURES 2 and 3, and the angles rest upon the webs 52 of the foot plates 51 and have openings through which bolts 90 extend through corresponding openings through webs in the foot plates and through the insulation layer 48 into the nuts 47. To protect against electrolytic corrosion since the structure of the walls and roof will suitably be of aluminum base alloys, the bolts 90 will, to great advantage, be insulated from the side wall structure and/or will suitably be of corrosion resisting alloy such as stainless steel.

At suitable intermediate points along the height of the panels the endmost extrusions have angles 91 fastened to the flanges $67'$ as by bolts 92, the angles being on the opposite edges of the panels. The angles have outstanding flanges which overlap as shown in FIGURE 3 and receive bolts 93 which laterally interconnect each panel to the next panel.

The end walls have panels which are constructed similar to the side walls, with plates similar to the foot plate 51 at the bottom and plates similar to the header plate 71 at the top.

The side walls 41 are suitably connected to the end walls 42 as shown in FIGURE 26. An end extrusion $57^2$ is similar to extrusion 57 except stiffening rib 67 is extended to form a connecting rib 69. Connecting rib 69 is suitably bolted to end connecting extrusion 69' at $69^2$. An end finish plate $69^3$ consists of a snap-in section $69^4$ similar to that of snap-in extrusion 57 and a U-section $69^5$ having an outwardly extending flange $69^6$ bolted to end connecting extrusion 69' and connecting rib 69 at $69^2$.

As best seen in FIGURES 1 and 24, each end of the housing has an access opening 94, which may be closed by a suitable door if desired. At the top and sides a channel 95 provides a frame which has on the side toward the panel an extrusion 96 whose web 97 rests against the web of the channel 95 and is secured thereto in any suitable manner, as by bolts not shown. The extrusion 96 has an outer flange 98 extending away from the channel 95 and an outer flange 100 extending toward channel 95, and has an inner flange 101 extending away from the channel 95. The channels 98 and 101 extend respectively outside and inside the extrusions 57 which are fastened thereto by rivets 68 and 70. The channel 95 is reenforced at the inside of the structure by a channel 102 in back-to-back relation and secured as by suitable bolts not shown.

At intervals suitably on either side of the end walls 42, there are provided doors 103 and at suitable places in the side walls there are provided doors 104. As best seen in FIGURE 25, a door header 105 extends along the top and sides of the door opening and includes a web 106 which has an outside flange 107 and an inside flange 108 which receive the wall extrusions 57 and are fastened thereto by suitable rivets 68 and 70. The header 105 has at the side toward the door frame an outside flange 110 and an inside flange 111 which receive suitable door frame members 112 suitably secured, as by bolts not shown, to the headers. At the bottom position corresponding to the still the header is reversed and connects with extrusions 57 which, at the bottom, are received by a special foot plate 51 having an outside upstanding flange 54', an outside downwardly extending flange 53' and an inside upwardly extending flange 55'. The flanges 54' and 55' are suitably connected as by riveting to the upright extrusion 57. The special door footplate is conveniently made as by welding the bottom flange of an angle 113 to the flange of a nangle 114 at 115.

The roof construction is best shown by FIGURES 1, 2 4, 5, 6 and 8.

Large panels 116 correspond in width to the side panels and are made of the same extrusions 57 forming the body of the roof panels and the same extrusions 57' at the sides of the roof panels. At the ends toward the outside, extrusions 71 are used as already described and the ends of the extrusions 57 extend into and are fastened as by rivets outside and into flanges 72 and 73.

At the ends toward the center or peak of the roof as shown in FIGURE 5 the extrusions 57 are secured and riveted outside and into flanges 72 and 73 of extrusions 71 as best seen in FIGURES 5 and 6.

At the ends of each panel of the roof an extrusion 57' is used having the deep flange 67', and near the outer ends the flanges 67' are secured as by bolts 117 to angle plates 118. The angle plates 118 extend outwardly and downwardly and overlap the angle plates 84 from the side panels and have openings 120 and 121 which line up with the openings 85 and 86 respectively in the angle plates 84 from the side wall panels.

The cooperating openings 85, 120 and 86, 121 of the corner plates receive pivot bolts 122 which are surrounded by a spacer tubing 123' and receive at the outer ends spacer washers 124' and nuts 125'. Normally the bolt 122 in the innermost openings 86 and 121 will be left in place as a hinge pin to interconnect the roof panel with the corresponding side wall panel, during shipping, but when the structure is erected the second bolt 122 is inserted at each end. If, on the other hand, it is desired to hold the roof section up and pivot the side wall section outwardly this can be accomplished by removing the pivot bolt 122 from the inner cooperating openings 86, 121 and pivot around the outer bolt, having removed the corner piece to be described.

A suitable arcuate corner piece 123 (FIGURE 2) extends between the plates 71 on the adjoining ends of the side wall panel and the corresponding roof panel. The corner piece 123 has suitably inner strengthening ribs 124 extending along intermediate points and short of the outer ends has deep inner ribs 125 which have suitable openings 126 at intervals which receive hook ends 127 of hook bolts 128 which pass through openings of the flanges 76 and are tightened by nuts 130 to hold the corner plate in position.

As best seen in FIGURE 10, suitable caulking at 131 is provided betwen the corner plates and the roof and side wall panels.

At the peak as best seen in FIGURES 5 and 7 the deep flange portions 67' of the endmost extrusions of the roof panels have bolted thereto at 132 bridging channels 133 extending to the opposite roof panel. Cutouts are provided at 134 in the lower portions of the extrusions 71 as best seen in FIGURES 5 and 7 for permitting the channels 133 to extend across. Angles 135 are connected by bolts 136 to the channels 133 and these angles connect by bolts 137 to the extrusions 71 so as to connect the ends of the extrusions 71 to channels 133.

A crown plate 138 bridges the space between the extrusions 71 at the center of the roof and has a central inner rib 140 which has openings 141 which receive the hooks 142 of hook bolts 143 which at the bottom pass down through openings in washers 144 against the extrusions 71 and are secured by nuts 145. Suitable caulking will be provided at 146 where the crown plate engages the extrusions 71 as desired.

At a central point in each of the oppositely sloping roof panels of a pair, it is desirable to locate a ventilator. Openings 146 are suitably punched in the webs of the extrusions forming the roof beneath the ventilator as best seen in FIGS. 8 and 9. Centrally located at each ventilator is placed a suitable rectangular collar 147 which consists of a web 148 desirably thickened toward the bottom, a transverse bottom flange 150 and an outwardly flaring top flange 151. There is an inwardly extending intermediate rib 152 from the web. The sections of the extrusion 147 are mitered at the corners and the rib 152 is cut away at 153 near the corners to receive an upwardly extending angle 154 best seen in FIGURES 12 and 16 which is secured to the collar 147 as by rivets 155. The collar 147 is fastened to the roof panel by bolts 156 with caulking if desired.

The collar 147 is desirably braced by cross braces 157 secured to the ribs 152 as by rivets 158, best seen in FIGURE 16. The angle uprights 154 extend considerably above the top of the collar and at the top there are suitably mounted, as by welding, nuts 160 best seen in FIGURES 12 and 13. The cap or cover for the ventilator 44 consists of supporting angles 161 extending transverse to the ridge of the roof, resting on the nuts 160, and secured at the ends as by welding to brackets 162. The top and the two sides of the cover consist of suitable aluminum snap-in extrusions 163 best seen in FIGURES 12 and 14 and consisting of webs 164 which have at one edge female socket sections including flanges 165, 166 and 167, which are generally in the shape of an inverted trapesium. Near the edge toward the web 164 there is a projection 168 which fits into an interlock recess 170 at the opposite end of the web 164. Adjoining the interlock recess 170 on the end of the web is a projection 171 following the inside of the trapesium shape of the flange 165 and having an angularly bent rib 172 at the end which interlocks within a rib 173 on the trapesium flange 165.

A rib 174 from the web fits immediately inside the trapesium flange 167 of the next extrusion, so that by deflecting the extrusions they can be snapped together as shown in FIGURE 12.

At front and back corners an extrusion is provided which resembles the others but has a curved web 164' as best seen in FIGURE 12.

The corresponding extrusions 163 and the angles 161 are bolted to the nuts 160 at the uprights 154 by bolts 175 extending through the extrusions and through spacers 176 and then through the angle 161 and into nut 160.

At the ends of the extrusions 163 brackets 177 are secured to the extrusions as by rivets 178, and the backets support extrusions on the sides of the cover which are connected to the brackets by rivets 180. At the top of the sides the webs are suitably cut off at 181 and at the bottom special cooperating snap-in extrusions 182 are suitably used having ribs 183 at the extreme bottom edges. The same is true of the bottoms of the front and back portions as shown in FIGURE 12.

As best seen in the FIGURE 12, the bottom of the cover terminates just below the outer flaring portion 151 of the collar but at a considerable distance outwardly thereof so that gas flowing upwardly as shown by the arrows 184 will pass through the openings 146 and through the space within the collar 147 and then will pass downwardly in the space between the bottom edge of the cover and the roof as suggested by arrows 185 and 186.

The ends of the extrusions forming the top of the cover are suitably connected to the extrusions at the sides by an extrusion 187 which has a web 188 running along the ends of the extrusions at the top and a flange 190 joined to the extrusions at the top by rivets 191, and a flange 192 extending under the extrusions 163 and then an angle flange 193 joined to the top-most side extrusion by rivets 194.

Figure 21:
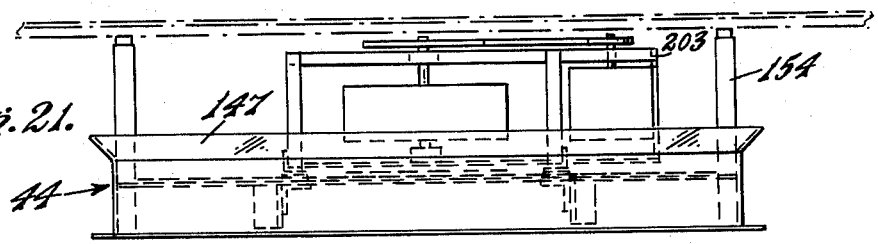
Figure 22:
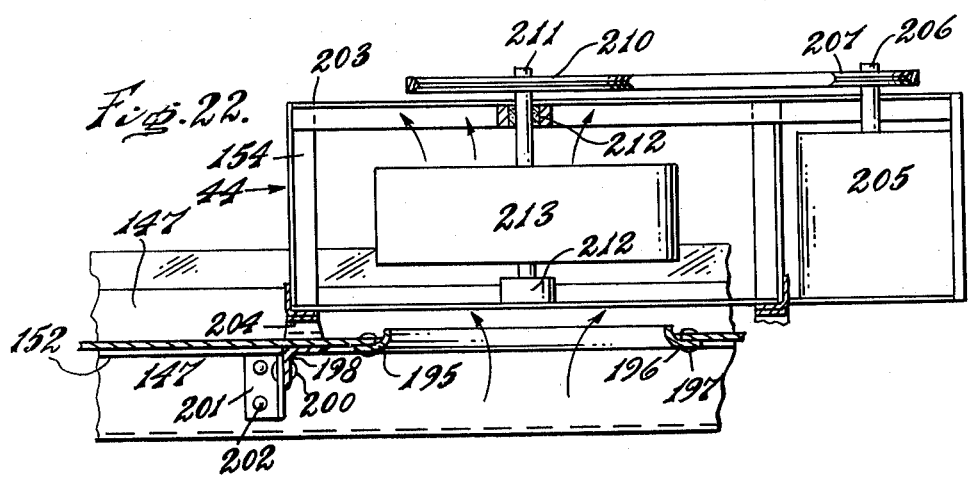

In some cases it is not sufficient to rely on natural ventilation and in FIGURES 20 to 22 we illustrate a modified ventilating assembly.

In this case an opening 195 suitably of circular form is cut in the cover extrusions 163, and a rim 196 is secured by rivets 197 to finish the inner edge of the opening. The collar 147 is constructed as before and provides the uprights 154 at the corners which are to connect to the cover.

Secured to the roof extrusions for bracing purposes on the sides are angles 198 anchored by rivets 200 to brackets 201 secured by rivets 202 to the extrusions 163.

On top of the roof but under the cover is provided a frame 203 which is secured to the roof extrusions 163 at 204 and which has mounted thereon an electric motor 205 provided with a shaft 206 and pulley 207 which connects by a belt 208 with a pulley 210 on shaft 211 journalled on bearings 212 in the frame carrying an exhaust fan impeller 213.

It will be evident that the fan will draw air through the opening in the roof and discharge it in the space between the ventilator cover and the roof.

FIGURE 23 illustrates a packing crate 214 to receive the components of one complete set of panels. There are shown roof sections 215 having ventilator collars 216, with the covers detached, pivotally connected in the manner previously described to side panels 217, the side panels being folded in on the roof panels. Suitable blocking 218 supports the combination of roof and side panels in the crate and a separate box construction 220 holds ventilator covers 221 as shown. It is thus possible to pack all of the components for four combinations of side panels, roof panels and ventilator assemblies in one crate.

In operation, the crate is disassembled and the combination of side and roof panels are opened to the correct position and the additional pivot bolts inserted to hold the construction in the desired shape. The units are then simply mounted end to end on the footings and bolted to the footings and also bolted to one another. Then the corner plates 123 are inserted and fastened into place and suitable caulking may be applied between one set of panels and the next as desired. The ventilating covers are then applied and finally the end panels are put in place.

In order to gain access to one part of the housing interior it is merely necessary to remove the crown plate and insert the hook of a crane and lift the combination of roof and side sections or if desired, a corner plate can be removed and using the crane to hold the large roof section, the pivot can be taken out and the corresponding side section released at the bottom and swing outwardly.

Entire sections can also be removed, if desired.

New sections can readily be added to enlarge the building.

In view of our invention and disclosure variations and modifications to meet individual whim or particular need will doubtless become evident to others skilled in the art, to obtain all or part of the benefits of my invention without copying the structure shown, and we, therefore, claim all such insofar as they fall within the reasonable spirit and scope of our claims.

Having thus described our invention what we claim as new and desire to secure by Letters Patent is:

1. In a building construction, a panel comprising metallic extrusions arranged side by side and having snap-in interconnections with one another, the extrusions having webs on one side which form a continuous surface of the panel and having extending away from the web of each extrusion, relatively shallow flanges and relatively deeper flanges to stiffen the panel, in combination with end plates having a web that extends across the ends of said extrusions, each end plate having one flange extending in front of the web of said extrusions, another flange extending behind the relatively shallow flanges of the extrusions and another flange that extends behind and engages the relatively deeper flanges of the extrusions.

2. In a roof construction, a plurality of roof panels forming an arch, each of which is made up of metallic members having snap-in interconnections, end plates on each panel at the adjoining ends, the end plates having webs which extend across the end of the extrusions and down beneath the panels, the extrusions making up the panels having in some cases relatively shallow flanges and in other cases relatively deeper flanges extending remote from the surface of the roof, recesses in the web of the end plates adjacent the deeper flanges of the extrusions and connectors extending from one panel to another fastened to the deeper flanges of the extrusions and passing through the recesses in the web of the end plates.

References Cited by the Examiner

UNITED STATES PATENTS

| | | | |
|---|---|---|---|
| 2,628,551 | 2/1953 | Leigh | 98—42 |
| 2,636,429 | 4/1953 | Parsons | 98—42 |
| 2,708,494 | 5/1955 | Larsen | 189—36 |
| 2,871,997 | 2/1959 | Simpson et al. | 52—93 |
| 2,989,154 | 6/1961 | Colby | 52—93 |
| 3,002,591 | 10/1961 | Hess | 52—493 |
| 3,010,547 | 11/1961 | Foster | 52—475 |
| 3,042,158 | 7/1962 | Michaels | 189—36 |
| 3,111,203 | 11/1963 | De Ridder | 52—588 |

FRANK L. ABBOTT, *Primary Examiner.*

RICHARD W. COOKE, JR., *Examiner.*

R. S. VERMUT, *Assistant Examiner.*